(12) United States Patent
Grace

(10) Patent No.: US 9,371,661 B2
(45) Date of Patent: Jun. 21, 2016

(54) WIND MITIGATION AND WIND POWER DEVICE

(76) Inventor: Winston Grace, Tamarac, FL (US)

( * ) Notice: Subject to any disclaimer, the term of this patent is extended or adjusted under 35 U.S.C. 154(b) by 1141 days.

(21) Appl. No.: 13/042,745

(22) Filed: Mar. 8, 2011

(65) Prior Publication Data

US 2011/0215586 A1 Sep. 8, 2011

Related U.S. Application Data

(60) Provisional application No. 61/311,503, filed on Mar. 8, 2010.

(51) Int. Cl.
*F03D 9/00* (2006.01)
*E04H 9/14* (2006.01)

(52) U.S. Cl.
CPC .. *E04H 9/14* (2013.01); *F03D 9/00* (2013.01); *Y02B 10/30* (2013.01); *Y02E 10/72* (2013.01)

(58) Field of Classification Search
CPC ............. E04H 9/14; F03D 9/00; Y02B 10/30; Y02E 10/72
USPC ............ 290/44, 55; 416/4, 155; 415/4.3, 908, 415/4.2, 2.1; 52/84, 94
See application file for complete search history.

(56) References Cited

U.S. PATENT DOCUMENTS

| | | | | |
|---|---|---|---|---|
| 3,895,236 A * | 7/1975 | Herron | | 290/55 |
| 4,024,409 A | 5/1977 | Payne | | |
| 4,446,379 A * | 5/1984 | Borg et al. | | 290/55 |
| 4,551,631 A * | 11/1985 | Trigilio | | 290/55 |
| 5,254,876 A * | 10/1993 | Hickey | | 290/55 |
| 6,153,944 A | 11/2000 | Clark | | |
| 6,601,348 B2 * | 8/2003 | Banks et al. | | 52/25 |
| 7,315,093 B2 * | 1/2008 | Graham, Sr. | | 290/55 |
| 7,425,772 B2 * | 9/2008 | Novo Vidal | | 290/52 |
| 7,493,759 B2 | 2/2009 | Bernitsas et al. | | |
| 7,989,973 B2 * | 8/2011 | Birkestrand | | 290/44 |
| 8,257,020 B2 * | 9/2012 | Graham, Sr. | | 415/4.3 |
| 8,338,977 B2 * | 12/2012 | Lee et al. | | 290/44 |
| 8,618,690 B2 * | 12/2013 | Seifert | | 290/55 |
| 2007/0126240 A1 * | 6/2007 | Richards et al. | | 290/55 |
| 2008/0224475 A1 * | 9/2008 | Mellor et al. | | 290/55 |
| 2009/0058091 A1 * | 3/2009 | Douglas | | 290/53 |
| 2010/0013238 A1 * | 1/2010 | Jessie et al. | | 290/55 |
| 2010/0133820 A1 * | 6/2010 | Tsao | | 290/44 |
| 2010/0320760 A1 * | 12/2010 | Yu et al. | | 290/44 |
| 2011/0133468 A1 * | 6/2011 | Leith | | 290/55 |
| 2013/0170986 A1 * | 7/2013 | Steel | | 416/5 |

* cited by examiner

*Primary Examiner* — Julio Gonzalez
(74) *Attorney, Agent, or Firm* — Mark D. Bowen; Malin Haley DiMaggio & Bowen, P.A.

(57) ABSTRACT

A wind mitigation system for attachment to a residential or commercial building to mitigate wind suction forces known to damage roof structures, and to harness wind energy to create electricity. The system may comprise one or more rotating cylinders which make use of the Magnus effect, a scientific phenomenon involving air flow over a rotating cylindrical object. Rotating Magnus cylinders are installed on the roof, preferably at or near the roof-wall junction of a building in order to provide the greatest suppression of perpendicular wind forces and resulting vortices. Wind flowing across the Magnus cylinders creates a downward force that is transferred to the roof by structural support brackets. The downward force counters the upward lifting forces generated by high winds so as to prevent uplifting of the roof structure. Electrical energy is generated from oscillations resulting from variations in wind speed.

2 Claims, 11 Drawing Sheets

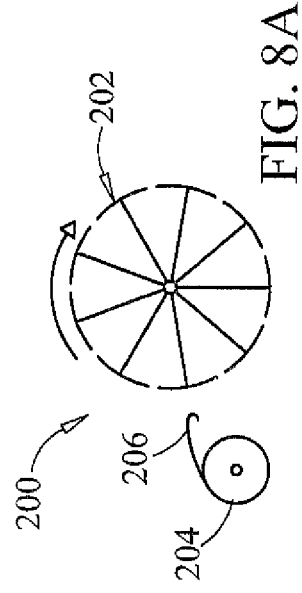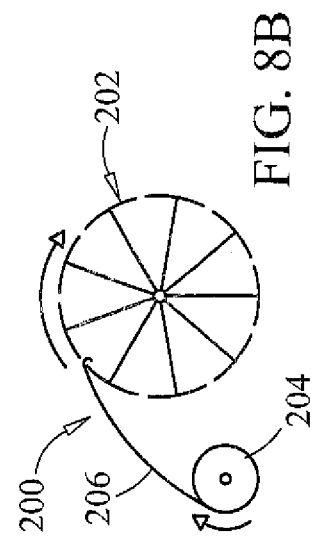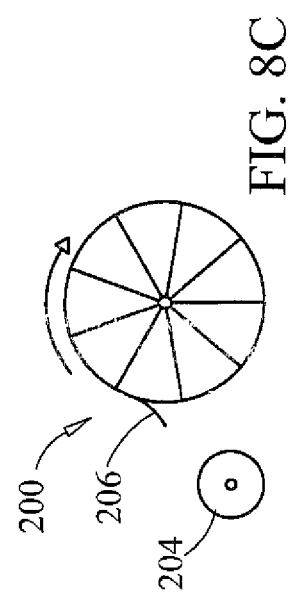

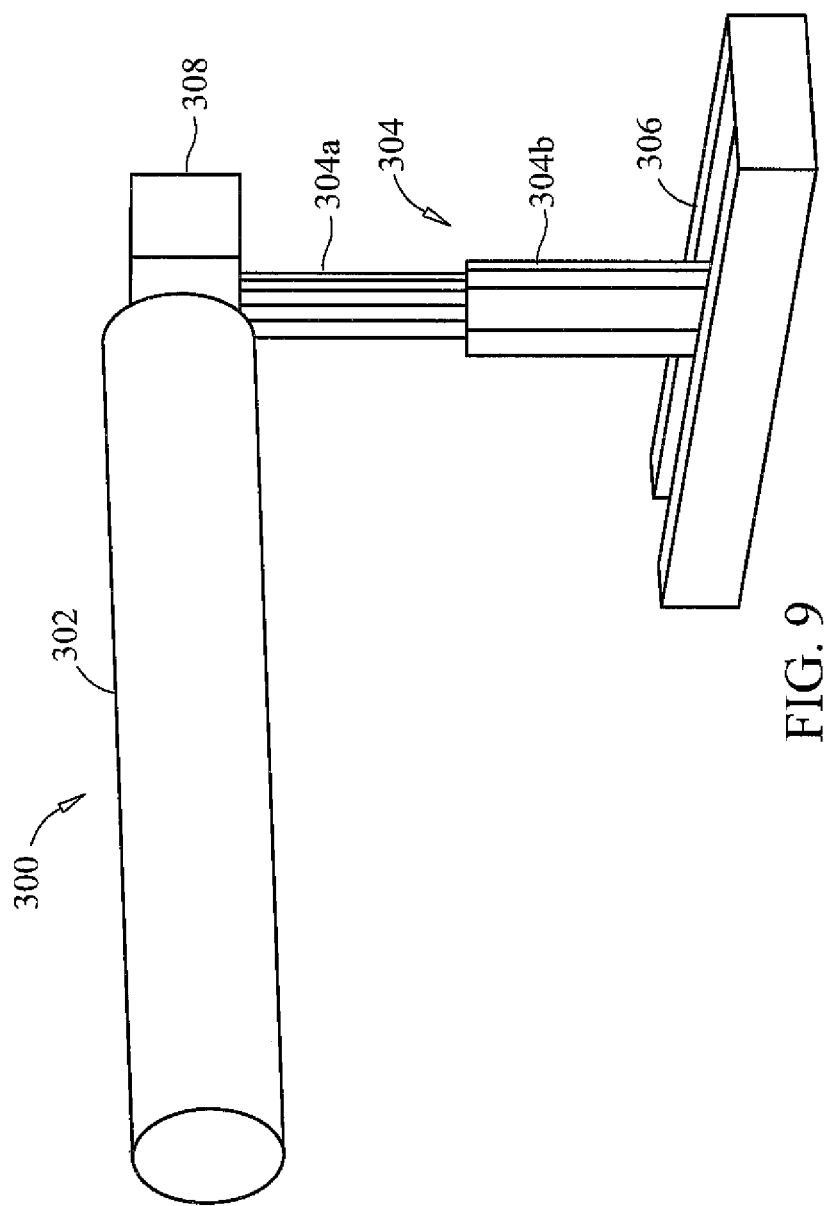

WIND MITIGATION AND WIND POWER DEVICE

CROSS REFERENCE TO RELATED APPLICATIONS

This application claims the benefit of provisional U.S. Patent Application Ser. No. 61/311,503, filed Mar. 8, 2010.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates generally to a wind damage mitigation and the harnessing of wind energy, and more particularly to a device which mitigates wind damage by applying a downward force to roof structures while simultaneously harnessing wind forces to produce energy.

2. Description of the Background Art

Every year, billions of dollars are spent on repairs due to wind damage. Many of these repairs involve damage to roofs or roof replacement entirely. The problem is especially prevalent in geographic locales which are subject to extreme weather patterns (i.e. Florida). Once a roof is damaged, the interior of a house may become exposed to the harsh elements often resulting in additional damage. The biggest concern for homeowners living in these harsh environments is preventing damage to roof structures.

High winds are known to create upward lift forces on roof structures on residential and commercial buildings. The sharply angled nature of the roof-wall junction causes swirling that creates an upward suction effect which acts on the roof. The upwardly pulling suction force becomes very powerful in high winds and is often powerful enough to break away a roof entirely from the rest of the house. The incidence of the suction phenomenon is greater when the wind is projected onto a flat-roofed building. The uplift force is considered to be the greatest force subjected to a building and is a common reason for failure.

The suction force is created when wind is acting in a generally perpendicular onto the side of a building. When the wind acts on the corner at the roof-wall junction, a conical-shaped vortex is created along the edges of the roof. The nature of the vortex creates a low pressure field along the roof-wall junction of a house. This phenomenon is responsible for the large uplifting force on the roof.

In view of the damage caused high winds, the background art reveals a number of attempts directed to adapting structures with wind mitigation systems. For example, U.S. Pat. No. 6,601,348, issued to Banks et al., discloses a system for mitigating wind suction atop a flat or slightly inclined roof. Numerous embodiments of a rooftop apparatus are provided which work similar to a spoiler on a car. The strategic placement and shape of an elongated apparatus mitigates the wind's suction forces created by strong lateral gusts projected onto the building. Once installed, the apparatuses are static and do not move. They simply redirect the flow of fluid (wind) to pass over the rooftop.

One shortcoming of this system is its fixed nature that is not capable of being set into motion. Dynamic movement of such a structure would maximize efficiency by not only redirecting the flow of the wind, but also using the wind to project a downward force on the roof, thus countering the suction effect. Furthermore, the wind contains an abundance of energy which is simply wasted when it is redirected and allowed to flow over the roof of a house. Therefore, it may be contemplated that such an apparatus could capture the energy of the wind as well.

Accordingly, there exists the need for new and useful devices and systems for mitigating the uplift effect caused by wind forces on a roof. Furthermore, there exists a need for a wind mitigating device that can be retrofitted onto a building and need not be installed while the structure is being built. Finally, there exists a need for a system which not only mitigates wind forces on a building, but harnesses wind forces in order to create energy. It is, therefore, to the effective resolution of the aforementioned problems and shortcomings of the prior art that the present invention is directed. In view of the wind mitigation systems in existence at the time of the present invention, it was not obvious to those persons of ordinary skill in the pertinent art as to how the identified needs could be fulfilled in an advantageous manner. The instant invention addresses this unfulfilled need in the prior art by providing a wind mitigation and harvesting system as contemplated by the instant invention disclosed herein.

SUMMARY OF THE INVENTION

The present invention is directed to a wind mitigation system for attachment to a residential or commercial building to mitigate wind suction forces and to harness wind energy to create electricity. The system may comprise one or more rotating cylinders which make use of the Magnus effect, a scientific phenomenon involving air flow over a rotating cylindrical object. In accordance with a preferred embodiment, Magnus cylinders are installed on the roof, preferably at or near the roof-wall junction of a building in order to provide the greatest suppression of perpendicular wind forces and resulting vortices. Wind flowing across the Magnus cylinders creates a downward force that is transferred to the roof by structural support brackets. The downward force counters the upward lifting forces generated by high winds so as to prevent uplifting of the roof structure. Alternate embodiments further function to generate electrical power from movement and/or oscillations of the Magnus cylinder structures thereby producing environmentally friendly electrical energy without presenting a hazard to wildlife, such as birds.

Accordingly, it is an object of this invention to provide a wind mitigation device and system which reduces the upward forces on a rooftop that are created by strong winds.

It is also an object of this invention to provide a wind mitigation device that harnesses the winds power to produce electricity.

BRIEF DESCRIPTION OF THE SEVERAL VIEWS OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

FIG. 8A is a side view illustration of a wind power apparatus adaptable to function as a Magnus effect apparatus in accordance with the present invention;

FIG. 8B is a side view illustration thereof showing initial deployment of a Magnus surface;

FIG. 8C is a side view illustration showing the Magnus surface fully deployed;

FIG. 9 is a perspective view of an embodiment of the present invention configured with a track to allow horizontal translation and a telescopic vertical support to allow for vertical translation.

Figure 1:
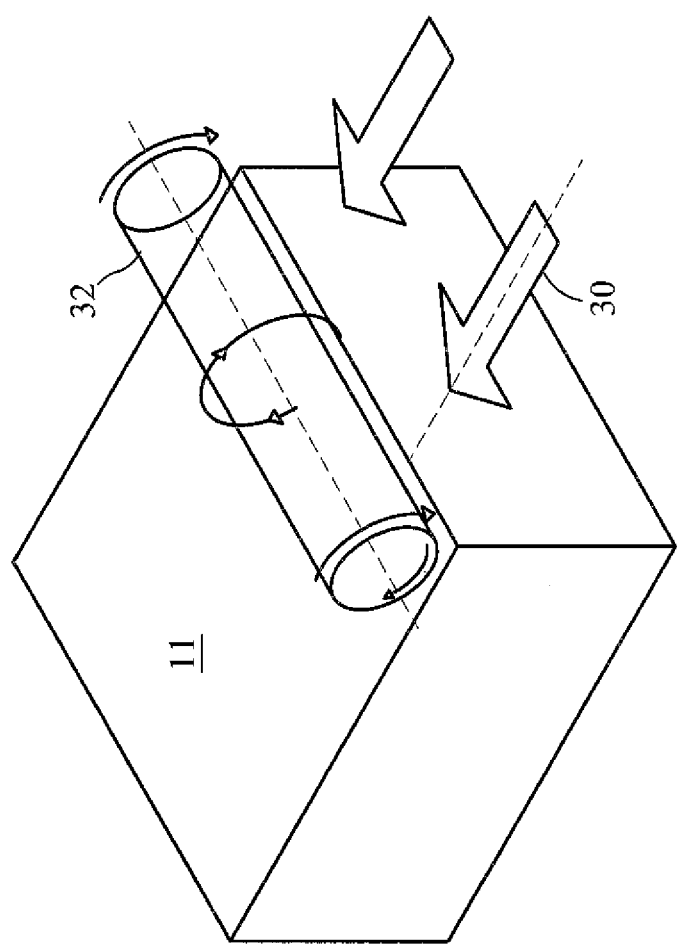
FIG. 1 is a perspective view illustrating the wind's effect on a building with a flat roof.

A better understanding of the invention will be obtained from the following detailed description of the preferred embodiments taken in conjunction with the drawings and the attached claims.

DETAILED DESCRIPTION OF THE INVENTION

With reference now to the drawings, and in particular to FIGS. 1 through 6 thereof; a system for mitigating the suction effect (i.e. lifting forces) of wind and harnessing the force of wind to generate electricity employing the principles and concepts of the preferred embodiment of the present invention, and generally designated by the reference numeral 10 will be described.

Figure 2:
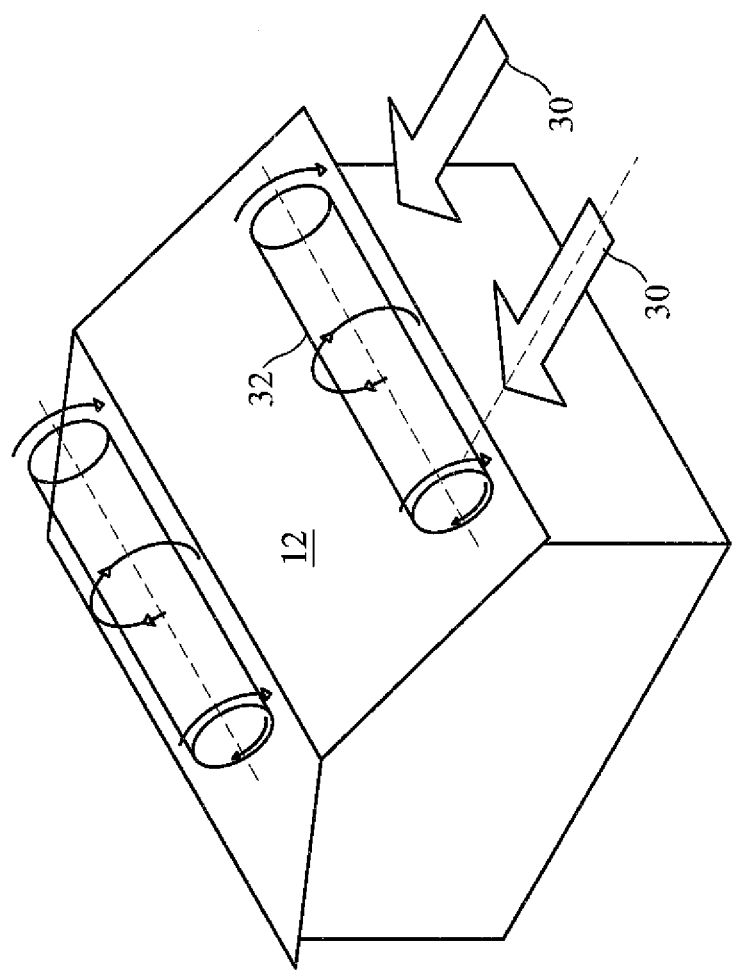
FIG. 2 is a perspective view illustrating the wind's effect on a building with a sloped roof.

With reference to FIG. 1, a building 10 with a flat roof 11 is shown. The arrows 30 indicate the direction of the wind as it is projected onto the building. The perpendicular flow of the wind 30 forms vortices 32 which create an uplifting force on the roof. This phenomenon is referred to as the suction effect and it is induced directly by the vortices 32. The suction effect is the primary mode of failure of roof tops during storms with heavy winds. FIG. 2 illustrates the effects of heavy winds on a building with a slightly pitched roof.

Figure 3:
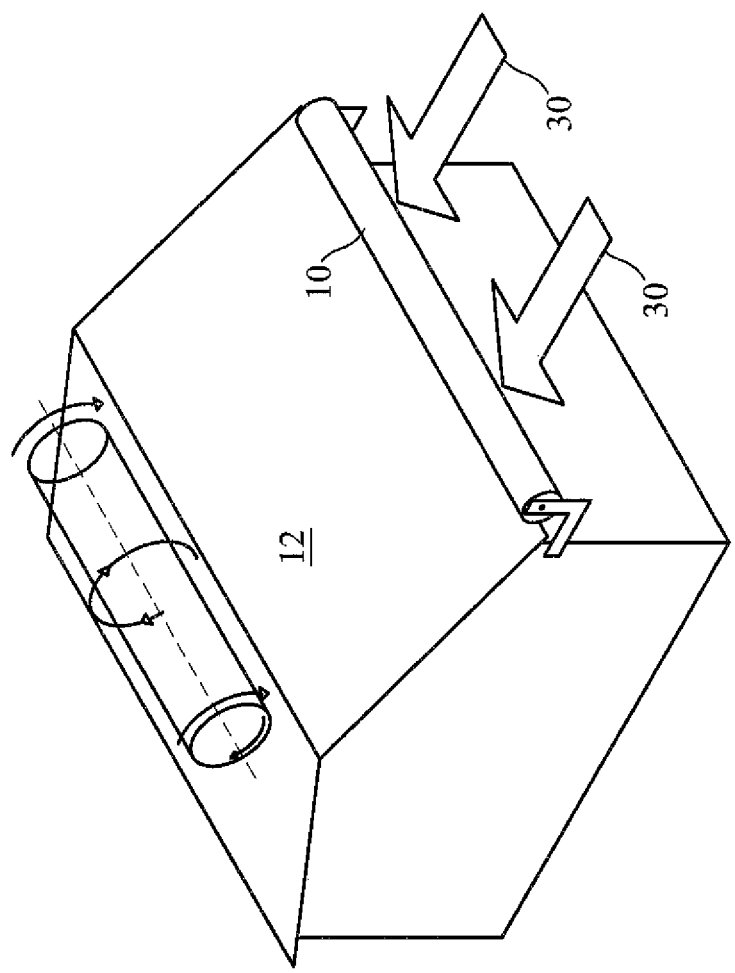
FIG. 3 is a perspective view of a building with the claimed invention installed at the roof-wall junction.

With reference to FIG. 3, the preferred embodiment of the present invention 10 is shown. An elongate, generally hollow cylinder 10 is mounted to a support structure, such as brackets attached to the side of the building. Cylinder 10 is mounted on the brackets in such a way that it is capable of axial rotation. An electric motor (not shown) is coupled to the cylinder which causes it to rotate in a clockwise direction at various speeds. The purpose of the rotation is to create an incidence of the Magnus effect as air passes over the cylinder.

Figure 4:
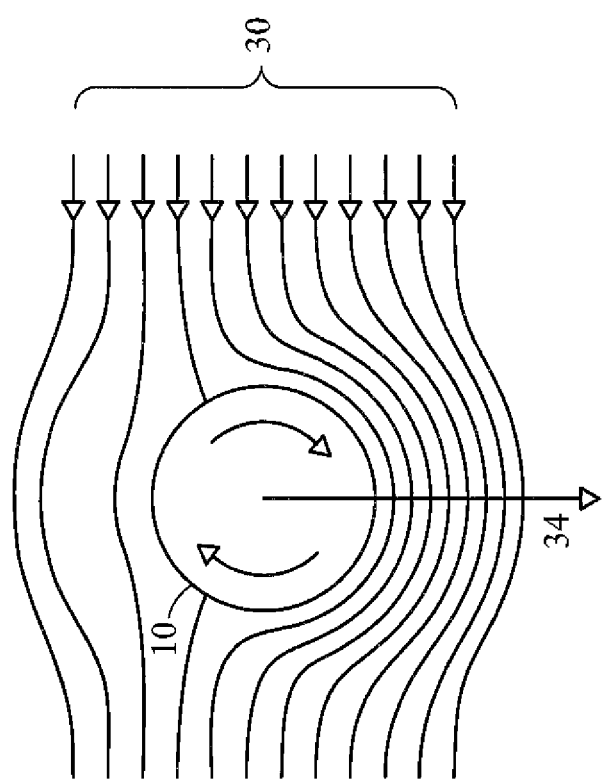
FIG. 4 is a cross sectional view of the cylinder of the claimed invention illustrating the Magnus effect force created by the flow of wind over the cylinder.

The Magnus effect becomes better understood with reference to FIG. 4 which shows a free-body-diagram of a cross section of the rotating cylinder. The force of the wind 30 projected onto the spinning cylinder 10 creates downward force, illustrated by reference number 34 that is generally perpendicular to the direction of the airflow. Cylinder 10 is rotated in a predetermined direction (e.g. clockwise or counter clockwise) depending on the airflow direction to produce a downward force as illustrated in FIG. 4. Because the cylinder 10 is rotated in a clockwise direction, that force 34 is projected downward due to the right to left wind direction depicted in FIG. 4, thereby pushing the cylinder 10 down. This downward force is preferably applied to the roof structure so as to provide resistance to uplifting forces. As should be apparent, the downward force may be applied to the roof structure via any suitable load transferring structure.

Figure 5:
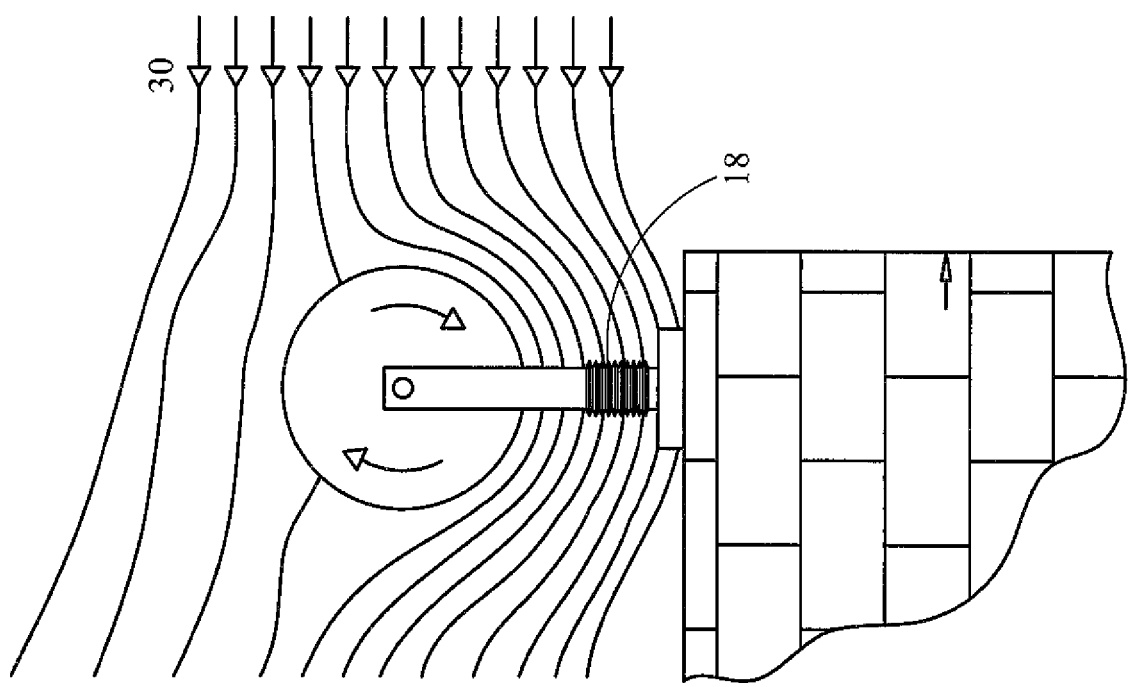
FIG. 5 is a side elevational view of another embodiment of the claimed invention installed atop a building with a flat roof.

Another embodiment of the present invention is shown in FIG. 5. As shown in FIG. 5, the cylinder 10 is horizontally supported in vertically spaced relation with the roof. Thus the downward force created by the Magnus effect is transferred to the surface of the roof onto which cylinder 10 is installed. This force works to counter the upward suction force on the roof that is generated by heavy winds.

Another feature of the device illustrated in FIG. 5 is the installation of an aeolian power generator 18 into the arms of the brackets which hold the cylinder 10. This gives the cylinder 10 and a portion of the cylinder mount a certain degree of freedom to oscillate vertically within the mount. The power generators 18 convert these oscillations into electricity. The electricity can be used to power the motor that spins the cylinder 10 and/or may also be made available for consumption by the occupants of the building. Due to the inconsistent nature and incidence of wind gusts, the cylinder 10 will be caused to shift a greater displacement downward as the force of the wind 30 increases. This is a result of the spring-like resiliency of the aeolian power generator 18. When the force of the wind 30 reaches a certain strength, the cylinder 10 will be pushed down as far as it possibly can in its 'seat'. At this point, the downward force created by the Magnus effect will be transferred to the roof in order to counter the suction effect.

Power generators 18 are preferably incorporated into the cylinder mounting structures and configured to harness movements of the cylinder to generate electrical current. In accordance with this embodiment, the cylinder mounting brackets are adapted to allow the cylinder to oscillate with variations in wind speed. Power generators 18 are incorporated into the cylinder mounting structures and comprise electrical generators, preferably in the form of magnets and conductor windings. Either the magnets or windings are fixed with the other being disposed in movable relation such that natural oscillation of the cylinder causes relative movement between the magnets and windings so as to generate an electrical current.

Figure 6:
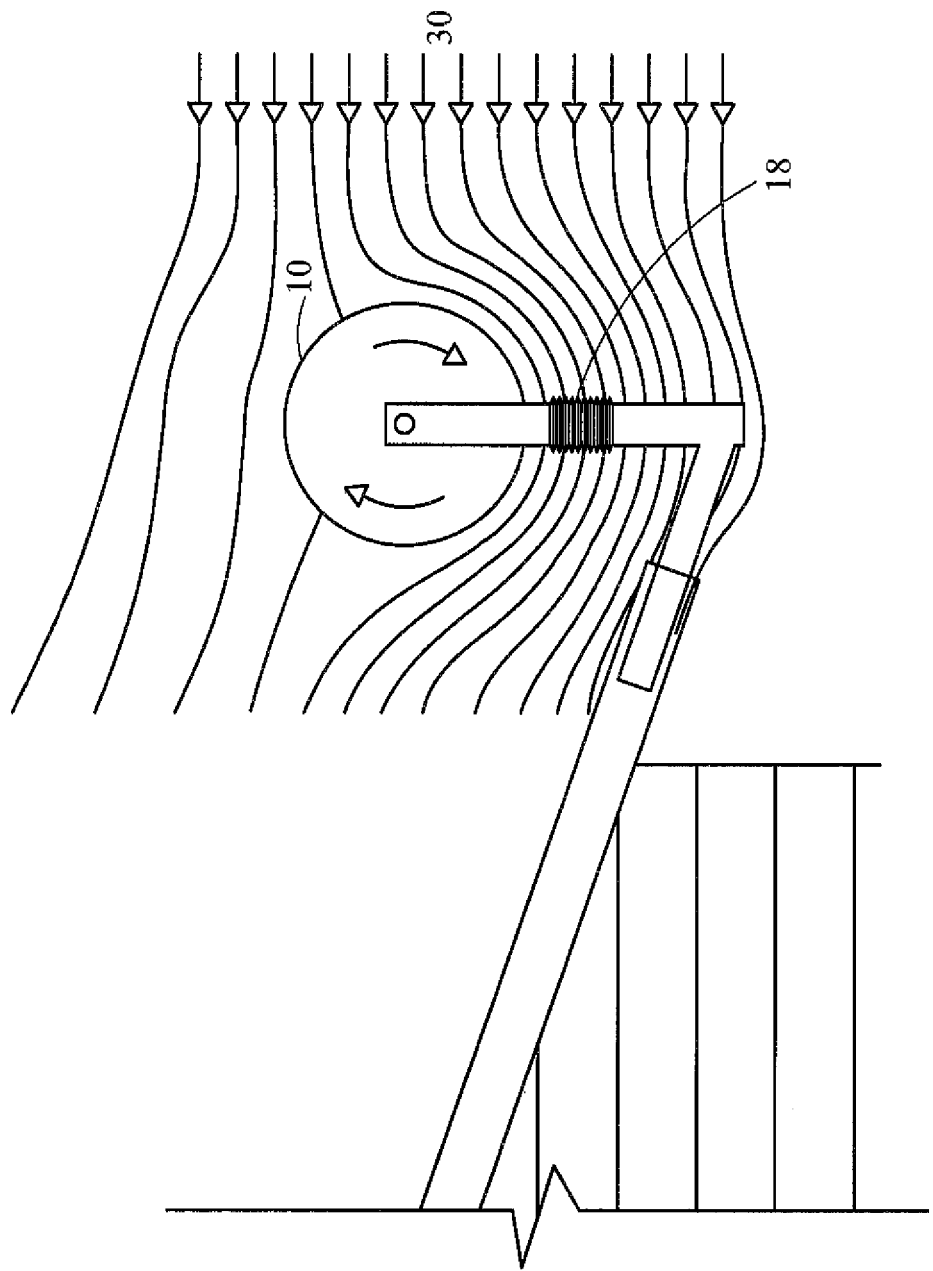
FIG. 6 is a side elevational view of another embodiment of the claimed invention installed atop a building with a sloped roof.

FIG. 6 shows yet another embodiment of the present invention installed upon a sloped roof. As evidenced by the figures, the inventor contemplates that the brackets which hold the cylinder may be mounted to the surface of the roof itself, the side of the roof, or the side of the building. Given the varying nature of roof-wall junctures on different buildings, different arrangements may be contemplated to best suit a given application. Furthermore, the device need not be relegated to the edges of a roof. Referring back to FIG. 2, the vertex of a sloped roof creates another wind vortex which induces an uplifting force on the top of the roof as well. Therefore, the present invention may be installed at the highest point of a roof or any other point thereon.

Figure 7A:
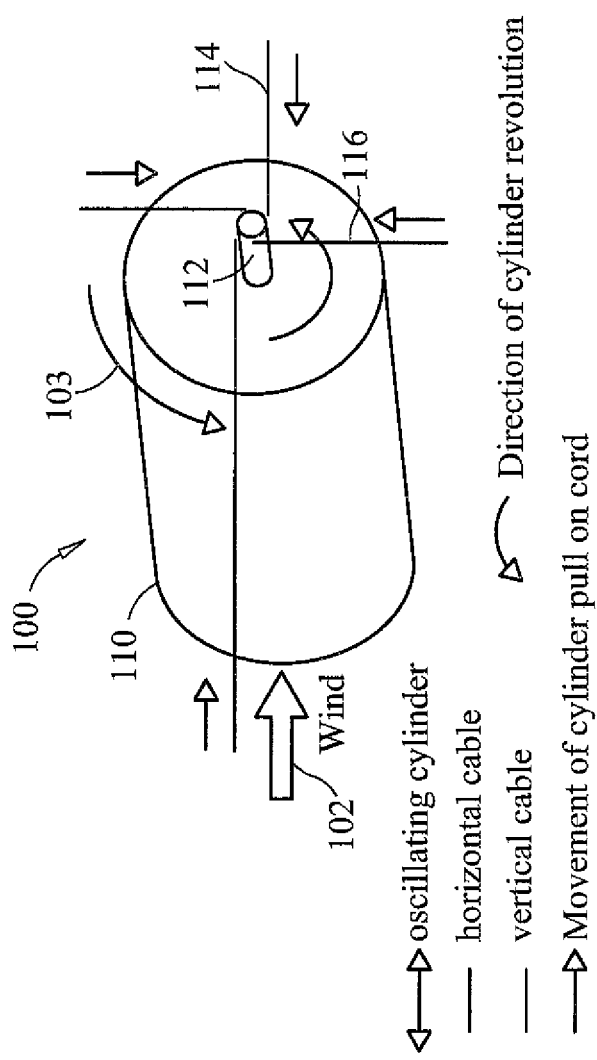
FIG. 7A is a perspective schematic illustration of an alternate self-powered embodiment wherein the cylinder axel is adapted with horizontal and vertical cables that harness translational movement.
Figure 7B:
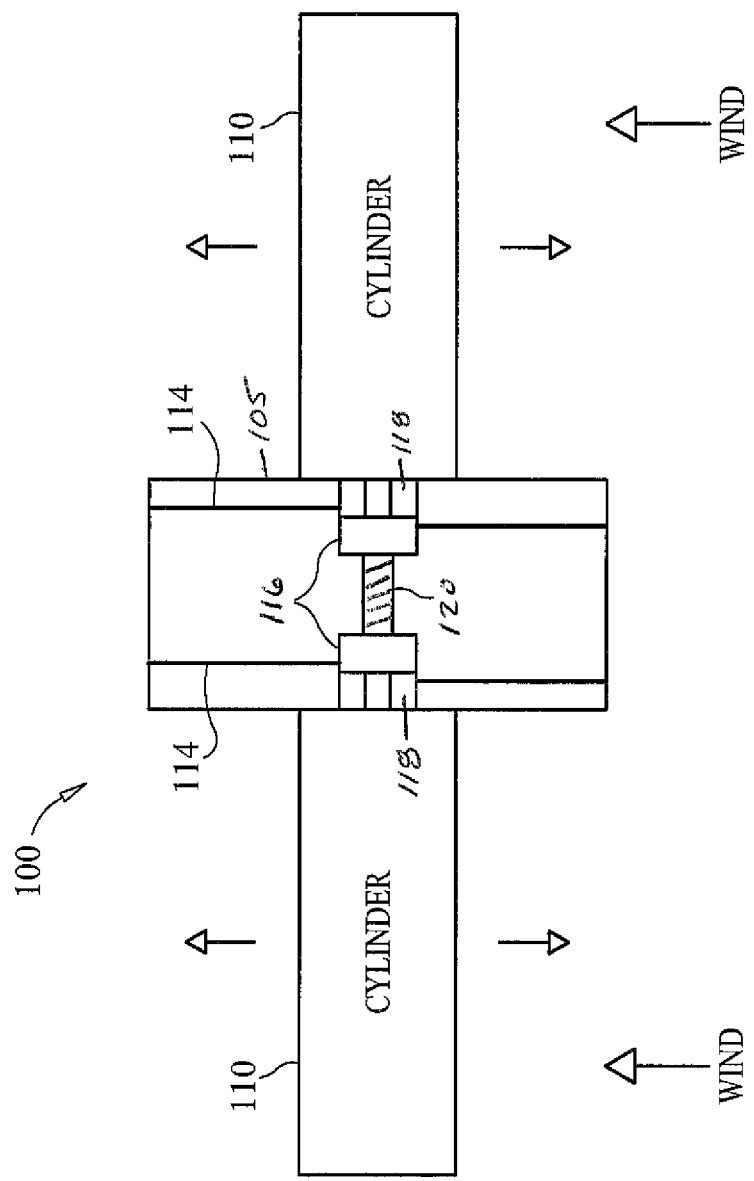
FIG. 7B is a top view schematic illustration of the alternate self-powered embodiment.

FIGS. 7A and 7B provide a schematic illustration of an alternate embodiment of an apparatus, generally referenced as 100, that harnesses variations in wind forces to self-power cylinder rotation. Arrow 102 indicates the direction of the wind, and arrow 103 indicates the direction of cylinder rotation. A generally hollow cylinder 110 is mounted to a track 105 attached to a building. FIG. 7B provides a top view schematic illustration showing two generally identical cylinders, referenced as 110 riding on a track 105. The cylinders 110 are mounted track 105 in such a way that they are able to rotate axially. Drag forces resulting from the wind blowing over a generally blunt object result forces that push cylinder 100 in a direction with the wind. There are two axial spools, namely a first spool 116 for winding and extension of cable 114 in response to horizontal movement, and two axial spools 118 for winding and extension of cable 116 in response to vertical movement. As wind pushes the cylinder in the direction of the said wind, the cable 114 unwinds from the spool, causing the cylinder to spin. As it spins, the Magnus Effect is allowed to be utilized, and downward force is encountered as the object moves in the direction of the wind. This in turn causes the cable from the vertical axis to unwind along the spool, increasing the rpm of the cylinder in the downward direction. A torsion spring 120 is axially connected to the spools in order that the spools will return to their original position. A significant aspect of this embodiment involves configuring the cylinder to rotate in the same direction (i.e. clockwise or counter clockwise) regardless of whether the cylinder is moving in the same or opposite direction of the wind so as to maintain the constant generation of a downward Magnus effect force. As the cylinders return to their original position, the same effect takes place on the opposite directions with the vertical and horizontal cables unwinding. The cables unwinding causing the cylinders to spin can in turn power a small generator from the revolutions of the cylinders. This generator can be used as a motor in the event of a windstorm.

In accordance with another embodiment, illustrated in FIGS. 8a-8c, there is a wind power device generally referenced as 200, adapted for rapid conversion to a Magnus effect apparatus in accordance with the present invention. FIG. 8a illustrates embodiment 200 wherein a wind powered device or wind turbine 202 is adapted with a spool 204 containing a sheet like material 206 wound thereon. Wind turbine 202 is preferably a Darrius type wind turbine, or any other suitable multi-blade wind turbine, and functions to generate electrical power by rotation about an axel 203 in a first mode of operation. FIG. 8b illustrates a partial deployment of material 206 onto the wind turbine 202 from spool 204. FIG. 8c illustrates full deployment of material 206 onto wind powered device 202 thereby forming a cylinder capable of harnessing the Magnus effect in a second mode of operation. In a preferred embodiment, control means are provided to selectively deploy sheet material 206 onto wind turbine 202 in response to predetermined conditions or parameters. For example, wind turbine 202 may operate in wind power mode to generate electricity and convert, upon deployment of sheet material 206, into Magnus effect operating mode in response to high wind speeds. Conversion to the Magnus effect operating mode would create a downward force that can be applied to the associated structure to enhance structural integrity of various building systems and components.

FIG. 9 is a perspective view of an embodiment of the present invention, generally referenced as 300. In accordance with this embodiment, a cylinder 302, is supported by a vertical cylinder support 304 in cantilevered relation therewith. Cylinder support 304 is slidably mounted to a generally horizontal track 306. Cylinder 302 is preferably rotatably connected to cylinder mount 308 disposed on the upper portion of vertical support 304. Cylinder mount 308 preferably includes a drive motor (not shown) adapted to cause cylinder 102 to rotate in a desired direction whereby cylinder 302 functions in accordance with the Magnus effect in response to naturally occurring atmospheric winds. Vertical support 304 preferably comprises upper and lower telescopically engaged sections, referenced as 304A and 304B, respectively. Upper section 304A is affixed to cylinder mount 308 and lower section 304B is in slidable relation with horizontal track 306. The vertical cylinder support is preferably spring biased to a normal operating position, while allowing for horizontal oscillation. As noted above, vertical support 304 is comprised of telescopically movable sections 304A and 304B such that Magnus effect forces can be harnessed to generate electrical energy using an electrical generator associated with vertical support 304. More particularly, in response to varying wind speed, the Magnus effect produces vertical oscillation of upper section 304A relative to section 304B is converted into electrical energy. The upper and lower sections are preferably spring biased to a normal operating position, while allowing for vertical oscillation. In addition, vertical support 304 is slidably mounted within horizontal track 306 and adapted to generate electrical energy from movement of vertical support 304 relative to track 306. The relative movement of vertical support 304 relative to track 306 may be harnessed by a fore and aft cables wound about a spool as illustrated in FIG. 7.

Figure 10:
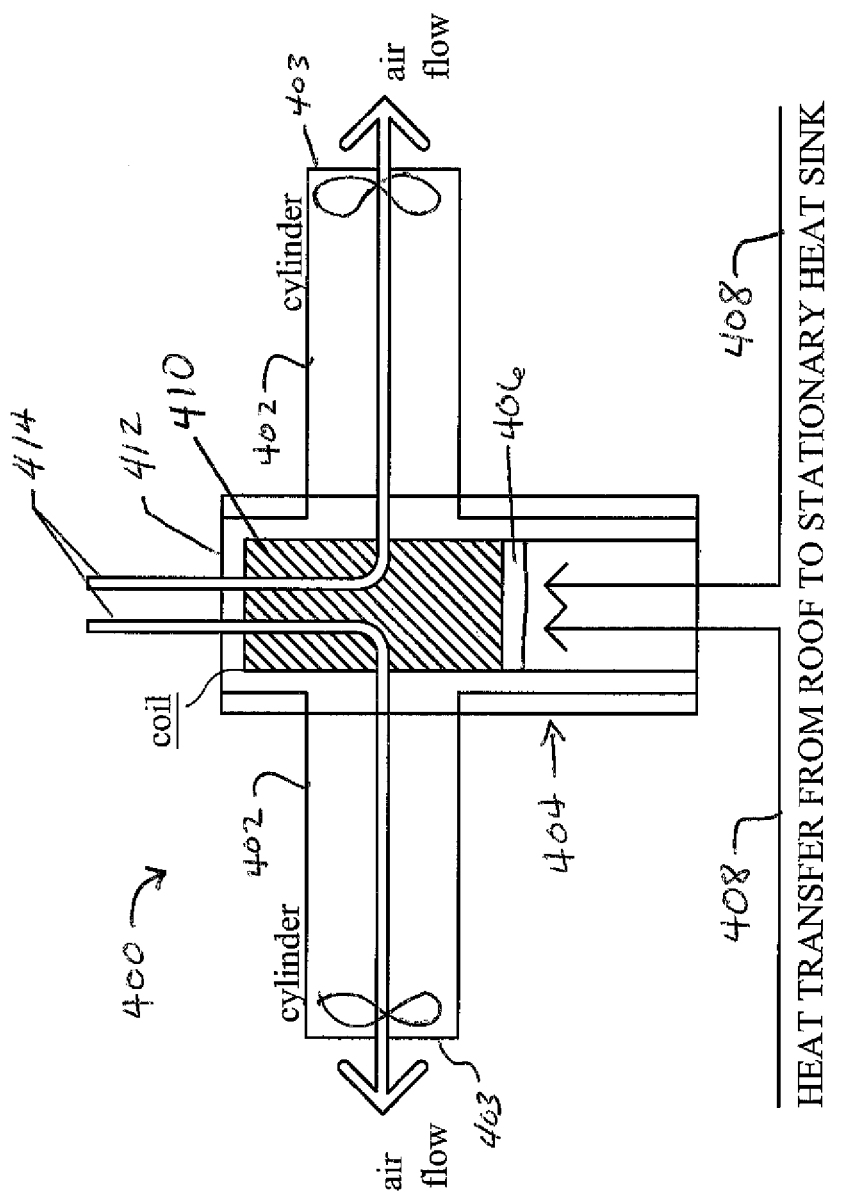
FIG. 10 is a schematic illustration of an alternate embodiment system of the present invention adapted with a thermoelectric generator.

FIG. 10 depicts yet another alternate embodiment, generally referenced as 400, wherein heat associated with the hot roof surface is harnessed by a thermoelectric generator to produce electrical power which may be used by an electric motor to cause cylinder rotation, or by the inhabitants of the structure. As best illustrated in FIG. 10, Magnus cylinders 402 are rotatably connected to a generally vertically disposed supporting structure 404 and define generally open ends 403. Supporting structure 404 includes a thermoelectric generator 406 which converts heat (temperature differences) directly into electrical energy, using a phenomenon called the "Seebeck effect" (or "thermoelectric effect"). Thermal conductors 408 conduct heat from the roof to thermoelectric generator 406. Thermal conductors may comprise metal bars having a high thermal conductivity, or may comprise more complex heat transfer devices. A heat transfer coil 410 is housed within supporting structure 404 in thermal communication with thermoelectric generator 406 and disposed in the airflow path of air entering an air inlet 412 defined by structure 404. Each cylinder 402 is preferably adapted with a fan blade 405 to move air through the cylinder for reasons more fully described herein.

Ambient air, referenced by arrows 414, is drawn by fan blades 405 into inlet 412 defined by structure 404. The air then flows across heat transfer coil 410 and through Magnus cylinders 402 before exiting the generally open ends 403 of Magnus cylinders 402. Accordingly, the thermoelectric generator 406 is exposed to a temperature differential (e.g. $\Delta T$) resulting from the relatively high temperature caused by conducting heat from the hot roof surface using thermal conductors 408 as compared with the relatively low temperature of the ambient air. As should be apparent, the temperature differential is maximized with structures having dark roofs. Thermoelectric generator 406 thus produces electrical power from this temperature differential, which electrical power may be used to drive rotation of Magnus cylinders 402, or may be used by inhabitants of the structure.

The electrical power generation capability of the system may be enhanced by covering the external surface of cylinders 402 with flexible solar panels which capture and convert solar energy to electrical energy. A significant advantage of this embodiment results as the cylindrical solar panels are capable of capturing solar energy from various angles.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What I claim is:

1. A system for mitigating damage to the roof of a building from lifting forces generated by high winds, said system comprising:
    a cylinder defining a cylindrical outer surface configured for powered rotation about an axis;
    said cylinder horizontally mounted to the building roof by a rigid support structure in a fixed position exposed to environmental wind flow;
    whereby axial rotation of said cylinder generates a downward force in accordance with the Magnus effect as winds pass around said cylindrical surface generally perpendicular relative to said axis; and
    said downward force transmitted from said cylinder to said roof for mitigating damage to the roof of the building.

2. A system for mitigating damage to the roof of a building from lifting forces generated by high winds, said system comprising:
    a horizontally disposed cylindrical surface configured for rotation about an axis;
    said cylindrical surface mounted to the building roof by a rigid support structure supporting said cylindrical surface at a fixed position above the building roof with said cylindrical surface exposed to environmental windflow;
    means for causing axial rotation of said cylindrical surface;
    said axial rotation of said cylindrical surface generating a downward force in accordance with the Magnus effect as wind passes around the cylindrical surface in a direction generally perpendicular to said axis; and
    all of said downward force applied to the building roof for mitigating damage to the roof of the building.

* * * * *